Patented Sept. 7, 1943

2,328,595

UNITED STATES PATENT OFFICE 2,328,595

PYRIMIDINE COMPOUND

Robert R. Williams, Roselle, and Joseph K. Cline, Woodbridge, N. J., assignors to Research Corporation, New York, N. Y., a corporation of New York No Drawing. Original application April 1, 1937, Serial No. 134,334. Divided and this application December 24, 1937, Serial No. 181,710

35 Claims. (Cl. 260—251)

This invention relates to pyrimidine compounds useful for the production of antineuritic compounds and, particularly, to the synthesis of pyrimidine compounds and various other intermediates which are useful for the production of vitamin $B_1$, salts thereof, and related products having the essential physiological properties of vitamin $B_1$. This application is a division of our copending application Serial No. 134,334, filed April 1, 1937.

The present invention relates to methods by which vitamin $B_1$ and kindred compounds may be synthesized. These syntheses make available vital substances which may be incorporated in pharmaceutical products and in foods deficient in vitamin $B_1$.

An object of the invention is to provide pyrimidine compounds and other intermediates useful in the synthesis of vitamin $B_1$ and its salts, and related compounds having the essential physiological properties thereof.

Another object of the invention is to provide effective and reliable processes for the production of pyrimidine compounds and other intermediates useful in the synthesis of vitamin $B_1$, its salts, and related compounds having similar physiological reactions.

Vitamin $B_1$ is obtained from natural sources in the form of its acid salts, usually as the chloride hydrochloride. These salts have the following general structure:

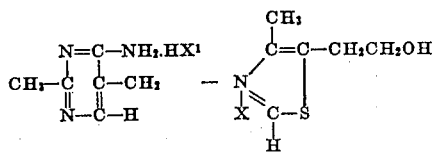

in which X is an anion and $HX^1$ is an acid, the anion portion of which may or may not be the same as the one represented by X.

The syntheses embodying this invention comprise the coupling of two distinct radicals or groups to form the vitamin or other closely allied substances. One of these groups is a derivative of pyrimidine having the constitution indicated by the following formula:

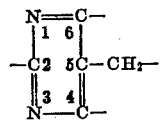

This has been termed the pyrimethyl group and the atoms of the pyrimidine ring portion thereof have been numbered as shown in the structural formula given hereinabove to designate the positions of any attached groups or elements. It is to be understood that when the term "pyrimethyl" is used herein or in the annexed claims to define a compound, it means that the group or element following this term is attached to the $CH_2$-group located in the 5-position on the pyrimidine ring portion of the compound. It will be observed that in vitamin $B_1$, the methyl group and the amino group are attached to the pyrimethyl group in the 2 and 6 positions, respectively, and that hydrogen is in the 4 position.

The other radical entering into the coupling reaction is a substituted thiazole nucleus, the nucleus having the structure indicated by the following formula:

From an examination of the formula given hereinabove for the acid salts of vitamin $B_1$, it is evident that the thiazole nucleus contained in the natural vitamin has attached thereto a hydrogen atom in the 2 position, a methyl group in the 4 position and a $\beta$-hydroxy-ethyl group in the 5 position. The basic compound having these attached groups is described in Patent No. 2,134,015, granted October 25, 1938, to R. R. Williams, for Thiazole compounds. Acids add directly to this thiazole to form salts thereof and these salts may be used in the syntheses instead of the base, if desired.

For the sake of clarity the following description will, in general, be confined to the utilization of 2-methyl-6-amino-pyrimethyl- compounds although it is to be understood that the invention is not limited to these particular pyrimethyl derivatives.

It has been found that one of the instrumentalities by which the pyrimethyl radical can be coupled to a thiazole group is a salt of a pyrimethyl ester, such as 2-methyl-6-amino-pyrimethyl-bromide hydrobromide, which has the formula:

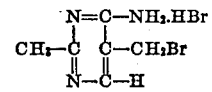

Acid salts of pyrimethyl esters of this general type may be coupled with a thiazole nucleus according to the following reaction:

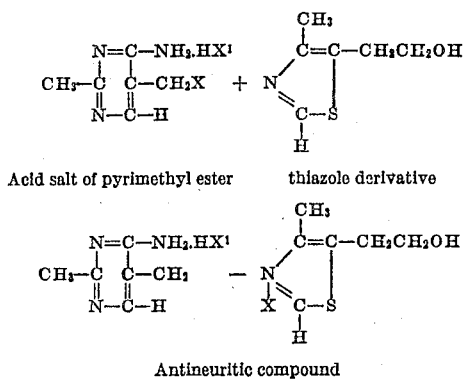

Acid salt of pyrimethyl ester     thiazole derivative

Antineuritic compound

In these equations X represents an acid radical and $HX^1$ is an acid.

In the reaction which occurs, it will be observed that the pyrimethyl portion and the acid radical portion of the ester, represented by the symbol X, both unite with the nitrogen atom of the thiazole to produce a quaternary thiazolium compound.

It has been found that effective results may be obtained by first producing a mixed ether such, for example, as 2-methyl-6-amino-pyrimethyl-ethyl ether or 2-methyl-6-amino-pyrimethyl-methyl ether and to obtain acid esters therefrom having the formula:

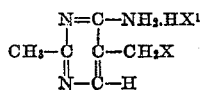

in which X is an acid radical in non-ionic combination and $HX^1$ is an acid, the anion portion of which may or may not be the same as the acid radical represented by X. The term "acid radical" as used herein is intended to denote not only a group of elements which act as a single element, e. g. the sulphate radical, but also elements, such as the halogens, which are acidic. The invention contemplates the reaction of a salt of a pyrimethyl ester of this type with a thiazole compound, such as 4-methyl-5-β-hydroxy-ethyl thiazole, or with a salt thereof, to produce a salt of vitamin $B_1$ or a closely related compound which has the essential physiological properties of vitamin $B_1$.

Among the pyrimethyl esters and salts thereof which may be employed in practicing the invention, there may be mentioned the bromide, acetate, lactate, benzoate, sulphate, phosphate, p-toluene sulphonate, benzene sulphonate and β-naphthalene sulphonate and acid salts thereof. A pyrimethyl ester of this type constitutes a means by which the pyrimethyl radical may be caused to unite with a thiazole nucleus, and a pyrimethyl ester may therefore be described as a reactive pyrimethyl compound, the term "reactive," as used herein, referring to the ability of the compound to react with a thiazole nucleus to produce a quaternary thiazolium derivative. It is further to be understood that the term "reactive pyrimethyl compound" means a compound having a reactive group attached to the methylene group in the 5-position on the pyrimidine ring portion thereof.

Instead of forming a pyrimethyl ester and separating it as a distinct compound a mixture of pyrimethyl alcohol or a pyrimethyl ether and an acid may be reacted directly with the appropriate thiazole, the important consideration being the use of a substance or a mixture which contains and will yield the pyrimethyl group in reactive condition. In carrying out the reaction, conditions should be chosen so as to supply an acid radical in order that the pyrimethyl radical and the acid radical may unite with the nitrogen atom of the thiazole compound to produce an antineuritic compound having the structure outlined above. The coupling reaction should preferably be carried out under acid conditions for the added reason that the antineuritic compounds produced are less stable under alkaline or neutral conditions. Also, because of the greater stability of their salts it has been found most advantageous to prepare and administer the antineuritic compounds in the form of their acid salts which have structures closely resembling that given hereinabove for the acid salts of vitamin $B_1$.

To illustrate the principles of the invention, specific examples will be given describing the coupling of 4-methyl-5-β-hydroxy-ethyl thiazole with the following 2-methyl-6-amino-pyrimethyl esters: bromide, acetate, lactate, benzoate, sulphate, phosphate, nitrate, benzene sulphonate, p-toluene sulphonate and β-naphthalene sulphonate.

This description will include a disclosure of a series of useful intermediate compounds containing the pyrimethyl radical from which the above esters may be prepared, one group comprising the ethers having the general formula:

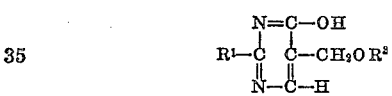

wherein $R^1$ and $R^2$ are respectively alkyl or aralkyl radicals (methyl, ethyl, propyl, benzyl, etc.). By replacing the 6-oxy radical of this compound with a 6-amino radical and the $—OR^2$ group with an acid radical, e. g. the sulphate or a sulphonate or bromine, a compound is produced which is capable of coupling with a thiazole nucleus as above set forth.

In our copending applications Serial No. 85,350, filed June 15, 1936, and Serial No. 94,430, filed August 5, 1936, of which the aforementioned application Serial No. 134,334 is a continuation in part, a compound, designated therein as 2-methyl-5-ethoxy-methyl-6-oxy-pyrimidine, and a method of preparing this compound were set forth. In accordance with one embodiment of the present invention, this compound is first produced and from it there is obtained an acid pyrimethyl ester which may be coupled with a suitable thiazole radical to produce antineuritic compounds. The description contained in these prior applications will be given herein for the sake of completeness. However, since the group

is designated the pyrimethyl group herein, changes in the nomenclature used in the previous specifications will be made wherever appropriate to utilize this terminology. For example, the compound termed 2-methyl-5-ethoxy-methyl-6-oxy pyrimidine in the former applications will be designated herein as 2-methyl-6-oxy-pyrimethyl-ethyl ether.

A description of the process for making 2-methyl-6-oxy-pyrimethyl-ethyl ether will first be given and this will be followed by specific examples of processes embodying the invention in which various pyrimethyl esters embodying the invention are obtained from this compound. These esters may be condensed or coupled with a thiazole compound to produce salts of vitamin $B_1$ and related compounds having the antineuritic properties thereof.

Example I

A suitable pyrimethyl ester for use in the coupling reaction is 2-methyl-6-amino-pyrimethyl-bromide hydrobromide and one process for making this bromide ester comprises a series of steps including those set forth in the aforementioned copending applications which are substantially as follows:

1. β-ethoxy-propionic-ethyl ester
2. Sodio-formyl-β-ethoxy-propionic-ethyl ester
3. 2-methyl-6-oxy-pyrimethyl-ethyl ether
4. 2-methyl-6-chlor-pyrimethyl-ethyl ether
5. 2-methyl-6-amino-pyrimethyl-ethyl ether
6. 2-methyl-6-amino-pyrimethyl-bromide The sequence and significance of these steps may be made more apparent by writing the structural formulae of the compounds, as follows:

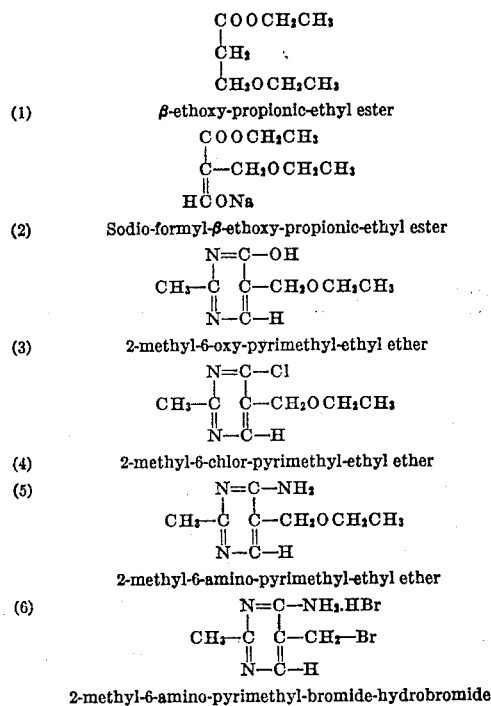

The steps in the following detailed disclosure correspond to the numbers in the above schedule.

*Step 1.*—A mixture of 116 gms. of sulphuric acid (sp. g. 1.84), 18 gms. of water, 200 cc. absolute alcohol, and 99 gms. of β-ethoxy-propionitrile is heated, under refluxing, for about six hours. At the end of this time, the mixture is cooled and allowed to stand until all the ammonium bisulphate produced has crystallized out. The ammonium bisulphate is filtered off, washed several times with absolute alcohol, and the combined filtrate and washings are distilled to remove the major portion of alcohol. Ice water is added to the residue, the excess acid neutralized, and the solution finally made slightly basic by the addition of sodium carbonate. The mixture is then extracted with ether, the ethereal solution dried over sodium sulphate, and the solution fractionated by distillation. β-ethoxy-propionic-ethyl ester is obtained in the form of a pleasant smelling, water-white liquid having a boiling point of about 70–72° at 24 mm. pressure. In this reaction compounds having alkyl radicals (and aralkyl radicals) other than the ethyl radical can be substituted.

*Step 2.*—A mixture of 73 gms. of β-ethoxy-propionic-ethyl ester and about 40 gms. of ethyl formate is slowly dropped onto 12 gms. of sodium wire covered with anhydrous ether. Hydrogen is evolved, and a yellow salt precipitates out of the ether. If the reaction proceeds slowly, without causing ebullition of the ether, the amount of sodium specified is sufficient. However, if the reaction proceeds violently, increasing amounts of sodium up to a total of two equivalents may be necessary. For best results, the time for addition of the ester is about eight hours. The thus formed sodio-formyl derivative is used without isolation in the succeeding reaction. It must be protected from atmospheric moisture and should be used promptly, as it is not very stable.

Instead of the above described derivative, compounds having the general formula:

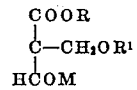

wherein R and $R^1$ are alkyl or aralkyl radicals and M is an alkali metal, may be produced from appropriate reagents, if desired, by a similar method and used in the succeeding step.

*Step 3.*—To the ether suspension of the sodio-formyl derivative obtained in Step 2, 45 gms. of acetamidine hydrochloride, 100 cc. of absolute alcohol, and a solution of 12 gms. of sodium in 200 cc. of absolute alcohol are added. The ether is distilled off, and the mixture heated, under refluxing, for about sixteen hours. The contents of the flask are then cooled, neutralized with 10% acetic acid, and evaporated down on a steam bath. The residue is taken up in a small amount of water and extracted repeatedly with chloroform. The combined chloroform extracts are dried with sodium sulphate and the chloroform removed by evaporation. The remaining brown, gummy substance is treated with dioxane, after which a portion dissolves and a considerable quantity of the gum is solidified. The solid is dried and sublimed in high vacuo at 140° C. The sublimate is placed in a Soxhlet extractor and extracted repeatedly with anhydrous ether. The residue is dried and again sublimed in high vacuo, yielding substantially pure 2-methyl-6-oxy-pyrimethyl-ethyl ether having a melting point of about 175° to 176° C.

Instead of proceeding as above set forth the following preferred method of carrying out Step 3 may be employed:

To the reaction mixture obtained in Step 2, add carefully a mixture of 100 to 200 gms. of crushed ice and water, just sufficient to produce solution of the material. The ether separates and is removed. There is then added 45 gms. of acetamidine hydrochloride followed by 10 gms. of NaOH (in the form of a 30% NaOH solution). The mixture is allowed to stand 3 to 4 days, after which it is neutralized with strong hydrochloric acid and is then extracted repeatedly with chloroform. The chloroform solution is evaporated to dryness and the crude product, 2-methyl-6-oxy-pyrimethyl-ethyl ether, is dried to constant weight. For purification it can be crystallized from amyl ether.

Instead of the specific compound produced as above described, compounds having the general formula:

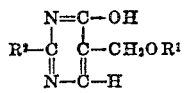

may be produced, wherein $R^1$ and $R^2$ are alkyl or aralkyl groups, by condensing compounds having the general formula indicated at the end of Step 2 with homologues of acetamidine, e. g. propamidine, butamidine, etc.

*Step 4.*—One gm. of 2-methyl-6-oxy-pyrimethyl-ethyl ether is heated with 8 cc. of phosphorous oxychloride for about three hours at 78° C. The phosphorous oxychloride is then removed in vacuo. The residue is poured onto ice and excess acid is neutralized by the addition of sodium bicarbonate or ammonia and the mixture extracted repeatedly with chloroform. The combined chloroform extracts are dried over sodium sulphate and the chloroform removed in vacuo. Approximately 1 gm. of an oily residue remains consisting largely of 2-methyl-6-chlor-pyrimethyl-ethyl ether.

By employing compounds having the general formula

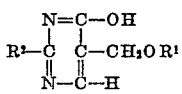

wherein $R^1$ and $R^2$ are alkyl or aralkyl radicals, compounds having the general formula

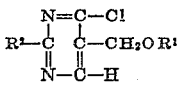

are obtained.

Instead of the 6-chlor pyrimethyl compounds just described, the corresponding 6-brom and 6-iodo compounds, which may be made in an analogous manner, may also be used if desired.

*Step 5.*—The product of Step 4 is treated with about 5 to 15 cc. of alcoholic ammonia in a bomb tube at about 140° C. for a period of time sufficient to convert all bromine into ionic form e. g. three hours. The contents of the tube are then evaporated down leaving a partly crystalline residue. This residue is dissolved in water, sodium bicarbonate or sodium carbonate is added and the solution extracted repeatedly with chloroform. The combined chloroform extracts are dried over sodium sulphate and the chloroform removed in vacuo, leaving an oily residue which crystallizes on standing and cooling. The crude product may be recrystallized from ether or ligroin, and pure 2-methyl-6-amino-pyrimethyl-ethyl ether, having a melting point of 89.5 to 90.5° C. is obtained. If desired, the crude product may be purified by repeatedly subliming it in high vacuo at 60° to 80° C.

By employing compounds having the general formula

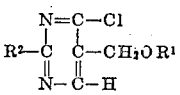

compounds having the formula

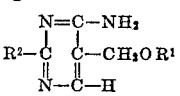

may be obtained, wherein $R^1$ and $R^2$ are alkyl or aralkyl radicals.

*Step 6.*—The 2-methyl-6-amino-pyrimethyl-ethyl ether produced in accordance with the process outlined in Step 5 may be treated in various ways to produce a hydrobromide of 2-methyl-6-amino-pyrimethyl-bromide. In one process 50 mgms. of 2-methyl-6-amino-pyrimethyl-ethyl ether are heated with 2 cc. of 60% hydrobromic acid in a bomb tube for about two and one-half hours at 100° C. The contents of the tube are then removed, and concentrated in vacuo.

When the solution reaches small volume, crystals will separate. One cc. of cold water is added and sodium bicarbonate is added to the clear solution. When the solution is neutral, a precipitate is formed. This precipitate is extracted with chloroform, the chloroform solution dried over anhydrous sodium sulphate and the chloroform finally removed in vacuo. The yield consists of about 20 mgms. of crystals which give a strongly positive test for bromine. At this stage, the crystals, consisting largely of 2-methyl-6-amino-pyrimethyl-bromide, are more or less contaminated with 2-methyl-6-oxy-pyrimethyl-bromide which may be removed as desired by extraction of the chloroform solution with dilute alkali.

About 20 mgms. of 2-methyl-6-amino-pyrimethyl-bromide are dissolved in 2 cc. of absolute alcohol and alcoholic hydrobromic acid is added whereupon a precipitate is formed. The alcohol and excess hydrobromic acid are removed in vacuo, leaving an acid ester which is a 2-methyl-6-amino-pyrimethyl-bromide hydrobromide.

This pyrimethyl-bromide hydrobromide may be condensed with 4-methyl-5-β-hydroxy-ethyl thiazole in accordance with the processes outlined in the aforementioned application Serial No. 134,334 to produce compounds having the characteristic antineuritic action of vitamin $B_1$.

*Example II*

In this example, the procedure outlined in Steps 1 to 5, inclusive, of Example I are followed to produce 2-methyl-6-amino-pyrimethyl-ethyl ether. This is then converted into a bromide hydrobromide as follows:

150 gms. of 2-methyl-6-amino-pyrimethyl-ethyl ether are heated with 7.75 liters of a 10% solution of hydrobromic acid in glacial acetic acid for two hours at 100° C. (This is a ratio of slightly more than 3 mole hydrobromic acid to one mole of the ether.) At the end of this time, the liquid remaining is decanted from the crystals which separate out. The crystals are washed several times with anhydrous ether and then may be purified by dissolving in a small amount of methanol and reprecipitating by the addition of the ether. The pure compound thus obtained melts at 192–193° C. and is a hydrobromide of 2-methyl-6-amino-pyrimethyl-bromide. The pure compound is not as stable as the crude product containing small amounts of free hydrobromic and glacial acetic acid, which appear to act as stabilizing agents.

Anal. calc. for $C_6H_9N_3Br_2$: C, 25.45; H, 3.21; N, 14.85; found, C, 26.56, 26.55, 26.48; H, 3.50, 3.62, 3.34; N, 14.71, 14.99.

The bromide hydrobromide produced in accordance with the preceding step is then coupled with a thiazole to produce an antineuritic substance in accordance with the procedures outlined in the aforementioned application Serial No. 134,334.

By coupling acid salts of pyrimethyl esters other than the above described bromide hydrobromide with a suitable thiazole, other salts of vitamin B₁ having comparable antineuritic properties may be prepared. The preparation of acid salts of a number of 2-methyl-6-amino-pyrimethyl esters and the coupling thereof with a thiazole nucleus to produce antineuritic compounds will now be described.

*Example III*

In accordance with this process, 2-methyl-6-amino-pyrimethyl-ethyl ether, obtained as described hereinbefore, is reacted with p-toluene sulphonic acid and the resulting p-toluene sulphonic acid salts of 2-methyl-6-amino-pyrimethyl-p-toluene sulphonate is condensed with 4-methyl-5-β-hydroxy-ethyl thiazole to produce a compound having the antineuritic activity characteristic of vitamin B₁. In practicing this process a mixture of 57 mgms. of 2-methyl-6-amino-pyrimethyl-ethyl ether and 125 mgms. of p-toluene sulphonic acid is heated at 110–120° C. for two hours. The mixture is then cooled, whereupon it solidifies. 50 mgms. of 4-methyl-5-β-hydroxy-ethyl thiazole are added and the resulting mixture is heated at 125° C. for forty-five minutes. The completely clear solution which is formed is cooled, and the product obtained is dissolved in 5 cc. of water. The pH is then adjusted to 5–6 by adding potassium bicarbonate, and the material is extracted with ether, the extracts being discarded. The aqueous solution obtained contains the p-toluene sulphonic acid salt of vitamin B₁ p-toluene sulphonate and exhibits an abundance of antineuritic activity.

*Example IV*

In this example benzene sulphonic acid is caused to react with 2-methyl-6-amino-pyrimethyl-ethyl ether to produce the benzene sulphonic acid salt of 2-methyl-6-amino-pyrimethyl benzene sulphonate. The latter compound is then caused to react with 4-methyl-5-β-hydroxy-ethyl thiazole to produce the benzene sulphonic acid salt of vitamin B₁ benzene sulphonate. In carrying out this process a mixture of 75.1 mgms. of benzene sulphonic acid with 26 mgms. of 2-methyl-6-amino-pyrimethyl-ethyl-ether is heated for two hours at 115° C. Then 22 mgms. of 4-methyl-5-β-hydroxy-ethyl thiazole are added and the mixture heated at 115° C. for one hour. The mixture is cooled, the product dissolved in 5 cc. of water, and potassium bicarbonate is added until the pH equals 5 or 6. Then the material is extracted with ether and the extracts discarded. The aqueous solution obtained possesses abundant antineuritic activity.

*Example V*

In practicing the process, a mixture of β-naphthalene sulphonic acid, 2-methyl-6-amino-pyrimethyl-ethyl-ether and glacial acetic acid is heated and the resulting product is treated with 4-methyl-5-β-hydroxy-ethyl thiazole to produce the β-naphthalene sulphonic acid salt of vitamin B₁ β-naphthalene sulphonate. The specific details of practicing this process consist in preparing a mixture of 62.4 mgms. of β-naphthalene sulphonic acid, 16.7 mgms. of 2-methyl-6-amino-pyrimethyl-ethyl ether and 1 cc. of glacial acetic acid and heating it at 100° C. for two hours. The mixture is then cooled and evaporated to dryness in vacuo. To the crystalline product thus obtained 14.5 mgms. of 4-methyl-5-β-hydroxy-ethyl thiazole are added and the mixture is heated at 115° for one hour. The product after cooling is dissolved in 5 cc. of water, after which the pH is adjusted to equal 5–6 by adding potassium bicarbonate. The product is extracted with ether, the extracts being discarded, and the aqueous solution obtained exhibits abundant antineuritic activity.

*Example VI*

In this method, benzene sulphonic acid is heated with 2-methyl-6-amino-pyrimethyl-ether and glacial acetic acid and the reaction product is condensed with 4-methyl-5-β-hydroxy-ethyl thiazole. The resulting product exhibits the characteristic antineuritic activity of salts of vitamin B₁. This method may be carried out by heating 64.7 mgms. of benzene sulphonic acid with 23 mgms. of 2-methyl-6-amino-pyrimethyl-ethyl ether in 1 cc. of glacial acetic acid for two hours at 116° C. This solution is evaporated to dryness in vacuo at 90° C. and a crystalline product results. Then 20 mgms. of 4-methyl-5-β-hydroxy-ethyl thiazole are added to the product and the mixture is heated at 115° C. for one hour. Upon cooling, the product is dissolved in 5 cc. of water and a pH equal 5–6 is obtained by adding potassium bicarbonate. The product is repeatedly extracted with ether and the extracts discarded. The aqueous solution obtained after extraction exhibits abundant antineuritic activity.

Antineuritic compounds similar to those described in Examples III, IV, V and VI may be obtained by substituting for the aryl sulphonic acids described therein suitable alkyl sulphonic acids, such as methyl sulphonic acid and its homologues. Persons skilled in the art may readily obtain the related alkyl sulphonates of the vitamin by suitably modifying the processes described in these examples. The esters employed comprise the sulphonic acid formula:

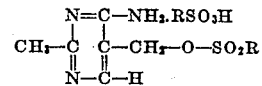

wherein R is an alkyl or aryl radical of the type described herein

*Example VII*

The hydrobromide of 2-methyl-6-amino-pyrimethyl-bromide produced in accordance with either Example I or Example II given hereinabove is caused to react with silver acetate to produce the corresponding acid ester, in which the bromide radical and hydrobromic acid of the pyrimethyl ester are replaced by the acetate radical and acetic acid, respectively. In carrying out this reaction 1.4 gms. of the hydrobromide of the substituted pyrimethyl-bromide are mixed with 1.8 gms. of silver acetate, 5 cc. of glacial acetic acid are added and the resulting mixture is heated on a steam bath for about one hour with occasional stirring. The reaction mixture is then cooled and filtered. The complete removal of the bromine atoms from the substituted pyrimidine is shown by the fact that the filtrate obtained gives no evidence of containing a halogen. The precipitate consisting of silver bromide is washed several times with small portions of glacial acetic acid and all of the filtrates are combined. A sufficient quantity of a 10% solution of hydrobromic acid in glacial acetic acid to replace the acetic acid, added to the amino group in the 6 position, by hydrobromic acid (1 molecular equivalent) is added to the filtrate and an excess of ether is added to precipitate the resulting compound. The precipitate which is the hydrobromide of 2-methyl-6-amino-pyrimethyl-acetate, is filtered out of the solution and the filtrate is washed with ether. The precipitate is then dissolved in butyl alcohol and an equivalent quantity of the hydrobromide of 4-methyl-5-β-hydroxy-ethyl thiazole is added to the solution which is then heated for one hour at about 115° C. The butyl alcohol is removed from the reaction product by evaporation and the residue is dissolved in water, filtered and its pH adjusted to 6. Physiological assays of this product show decided antineuritic activity.

It is preferable to couple the hydrobromide of the pyrimethyl-acetate with the thiazole because the salts of vitamin $B_1$ which have an acid reaction are the more stable ones and the presence of hydrobromic acid is therefore desirable in place of the relatively weak acetic acid in order to obtain a more stable antineuritic salt. However, it is not essential to employ the hydrobromide of this ester and antineuritic compounds may be obtained by using the acetic acid salt of the pyrimethyl-acetate in the coupling reaction.

*Example VIII*

By a reaction similar to that described under Example VII the lactic acid salt of 2-methyl-6-amino-pyrimethyl-lactate may be employed to produce an acid salt of vitamin $B_1$ having antineuritic properties. In this process 1.7 gms. of 2-methyl-6-amino-pyrimethyl - bromide hydrobromide are caused to react with 1.07 gms. of silver lactate to produce the lactic acid salt of the corresponding pyrimethyl-lactate. This may be treated as described in Example VII with hydrobromic acid to replace the lactic acid attached to the 6-amino group and then condensed with 4-methyl-5-β-hydroxy-ethyl thiazole. Or, the unsubstituted lactic acid salt of the pyrimethyl lactate may be condensed with the thiazole, if desired. The resulting products also exhibit the physiological properties of vitamin $B_1$.

*Example IX*

By procedure substantially identical with that described in Examples VII and VIII, 2-methyl-6-amino - pyrimethyl - bromide hydrobromide is treated with silver benzoate. The benzoate ion in the resulting product may be replaced by the bromide ion and the resulting product condensed with the hydrobromide of 4-methyl-5-β-hydroxy-ethyl thiazole. In this reaction, 1.4 gms. of the bromide hydrobromide of the substituted pyrimidine are caused to react with 2.29 gms. of silver benzoate, and in the remaining steps of the process sufficient quantities of hydrobromic acid and of 4-methyl-5-β-hydroxy-ethyl thiazole, respectively, are employed to constitute molar equivalents. Also the unreplaced benzoic acid salt of the pyrimethyl benzoate may be utilized, if desired, in the coupling reaction. In either case, products having strong antineuritic action are obtained.

By methods analogous to the foregoing ones, the corresponding acid salts of the chloride, sulphate, phosphate and nitrate esters of the aforementioned pyrimethyl compound may be prepared and caused to condense with a suitable thiazole, for example, 4-methyl-5-β-hydroxy-ethyl thiazole, to produce compounds having antineuritic properties.

The antineuritic compounds described in the various examples given herein may be separated from their impurities and obtained in a substantially pure state by suitable adaptations of the method of isolation outlined in Example II hereof.

The fact that all of the compounds resulting from the coupling reactions described hereinabove exhibit antineuritic activity clearly demonstrated that this property is obtained in compounds having a substituted pyrimethyl group coupled with a substituted thiazole group and which possess the following general formula:

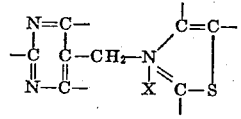

in which X represents an acid radical which may be varied almost at will. Although in all of the examples recited hereinabove, the pyrimethyl group has a methyl group located in the 2 position and an amino group in the 6 position and the thiazole group has a methyl group in the 4 position and a β-hydroxy-ethyl group in the 5 position, the invention is not limited to these particular derivatives. For example, the methyl group in the 2 position of the pyrimethyl radical may be replaced by the homologues thereof, such as the ethyl and propyl groups. Likewise, the methyl group in the 4 position of the thiazole ring may be replaced by related groups, such as the ethyl and propyl radicals.

In the foregoing description pyrimethyl esters have been the reactive pyrimethyl compounds particularly described, but it is to be understood that the invention is not limited to the coupling with a thiazole of a pyrimethyl ester which has been isolated as such before the coupling reaction is effected. The invention also contemplates the utilization of a pyrimethyl alcohol, ether or ester in the presence of an acid in a coupling reaction whereby the pyrimethyl group and the anion portion of the acid add directly to the nitrogen of the thiazole to produce a quaternary thiazole compound. These compounds are all examples of reactive pyrimethyl compounds as that term is employed herein.

In most of the above described coupling or condensing reactions, a basic thiazole, such as 4-methyl-5-β-hydroxy-ethyl thiazole, has been specifically mentioned. However, these reactions will also proceed satisfactorily if salts of the thiazole are employed instead of the free base. Thus, for example, the hydrobromide of 4-methyl-5-β-hydroxy-ethyl thiazole may be coupled with the hydrobromide of 2-methyl-6-amino-pyrimethyl-bromide to produce the hydrobromide of vitamin $B_1$. Hence, whenever the term "thiazole" is used herein, it is intended to mean either the free base or a salt of the thiazole.

Also, in general, where 6-amino-pyrimethyl and other amino compounds are mentioned, the acid salts thereof formed by the addition of acids to the basic amino groups are also contemplated. Consequently, the formulae given herein and in the annexed claims for the basic amino compounds are intended to comprise the salts. For convenience of operation it is sometimes more advantageous to use the free base and at other times better to employ a salt thereof. The particular compound employed will of course be chosen to fit the requirements of the reaction involved.

Where alkyl groups are described as substituents in the various compounds mentioned herein, aralkyl groups may in general be used with satisfactory results. Hence, when the term "alkyl" is used herein and in the annexed claims, it is also intended to embrace the aralkyl groups.

What is claimed is:

1. The process which comprises treating a 2-methyl-6-amino-pyrimethyl-alkyl ether with an acid to produce the corresponding pyrimethyl ester of the acid.

2. The process which comprises treating a 2-methyl-6-amino-pyrimethyl-alkyl ether with benzene sulphonic acid to replace the alkoxy group in the ether with a benzene sulphonate group.

3. The process which comprises treating 2-methyl-6-amino-pyrimethyl bromide with a silver salt capable of replacing the bromide radical in said pyrimethyl compound with the acid component of the salt.

4. The process which comprises treating 2-methyl-6-amino-pyrimethyl bromide with a silver salt from the group consisting of the acetate, the lactate, the benzoate, nitrate, phosphate and sulphate salts of silver to replace the bromide radical in the first mentioned compound with the acid component of the salt.

5. The process which comprises treating 2-methyl-6-amino-pyrimethyl bromide with silver acetate to replace the bromine therein with the acetate radical.

6. The process which comprises treating a 2-methyl-6-amino-pyrimethyl-alkyl ether with a compound of the group consisting of the alkyl and aryl sulphonic acids to replace the alkoxy group in the ether with a sulphonate group.

7. A 2-methyl-6-amino-pyrimethyl halide.

8. A process which comprises converting a compound having the general formula

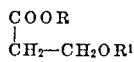

in which R and R¹ are members of the group consisting of the alkyl and aralkyl groups, into

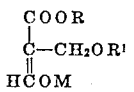

in which M is an alkali metal by reacting the first mentioned compound with an alkyl ester or formic acid in the presence of the alkali metal; condensing the latter with a compound having the general formula

in which R² is a member of the group consisting of the alkyl and aralkyl groups, to produce a compound having the formula

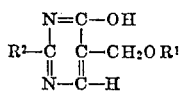

in which R¹ and R² have the same significance as above; replacing the hydroxyl group in the latter compound with a halogen by treating said compound with a phosphorous-containing halogenating agent; replacing the halogen of the last mentioned compound with an amino group by treating said compound with ammonia; and treating the latter product with an acid to convert it into a pyrimethyl ester.

9. A series of compounds of the group having the formulae:

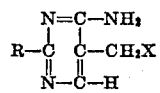

and

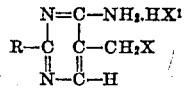

in which X is an acid radical, HK¹ is an acid, and R is a member of the class consisting of the alkyl and aralkyl groups.

10. The process which comprises treating 2-methyl-6-amino-pyrimethyl-ethyl ether with an acid to produce the corresponding pyrimethyl ester of the acid.

11. The process which comprises treating a 2-methyl-6-amino-pyrimethyl-alkyl ether with an acid from the group consisting of the hydrohalic and the alkyl and aryl sulphonic acids to produce the corresponding pyrimethyl ester of the acid.

12. The process which comprises treating 2-methyl 6-amino-pyrimethyl-ethyl ether with an acid from the group consisting of the hydrohalic and the alkyl and aryl sulphonic acids to produce the corresponding pyrimethyl ester of the acid.

13. The process which comprises treating a 2-methyl-6-amino-pyrimethyl-alkyl ether with a hydrohalic acid to produce the corresponding pyrimethyl ester of the acid.

14. The process which comprises treating 2-methyl 6-amino-pyrimethyl-ethyl ether with an hydrohalic acid to produce the corresponding pyrimethyl ester of the acid.

15. The process which comprises treating a 2-methyl-6-amino-pyrimethyl-alkyl ether with an aryl sulphonic acid to produce the corresponding pyrimethyl ester of the sulphonic acid.

16. The process which comprises reacting a 2-methyl-6-amino-pyrimethyl-alkyl ether with hydrobromic acid, and treating the resulting bromide ester with a silver salt capable of replacing the bromide radical in said ester with the acid component of the salt.

17. The process which comprises reacting 2-methyl-6-amino-pyrimethyl-ethyl ether with hydrobromic acid, and treating the resulting bromide ester with a silver salt capable of replacing the bromide in said ester with the acid component of the salt.

18. The compound 2-methyl-6-amino-pyrimethyl-acetate.

19. The process for the production of 2-methyl-6-amino-pyrimethyl bromide which comprises reacting 2-methyl-6-amino-pyrimethyl-ethyl-ether with hydrobromic acid.

20. The process which comprises treating 2-methyl-6-amino-pyrimethyl-ethyl-ether with an excess of a 10% solution of hydrobromic acid in glacial acetic acid.

21. A compound of the group consisting of the compounds having the formula

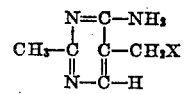

and acid salts thereof, in which compounds X is an acid radical.

22. A compound of the group consisting of the compounds having the formula

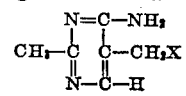

and acid salts thereof, in which compounds X is an acid radical, and in which at least one of the group consisting of the radicals represented by X and the radicals forming the anions of the acid salts is bromine.

23. The process which comprises condensing the sodio-formyl derivative of β-ethoxy-propionic-ethyl ester with acetamidine to produce 2-methyl-6-hydroxy-pyrimethyl-ethyl ether, reacting the resulting product with phosphorus oxychloride, treating the resulting 2-methyl-6-chloro-pyrimethyl-ethyl-ether with ammonia to form 2-methyl-6-amino-pyrimethyl-ethyl ether, and reacting the latter compound with hydrobromic acid to produce 2-methyl-6-amino-pyrimethyl-bromide.

24. 2-alkyl-6-amino-pyrialkyl-halide esters.

25. 2-alkyl-6-amino-pyrialkyl-inorganic esters.

26. 2-alkyl-6-amino-pyrialkyl esters.

27. Pyrimidine compounds of the general formula

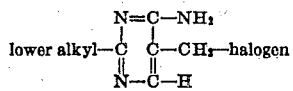

28. The pyrimidine compound having the formula

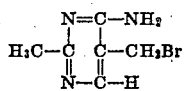

29. Pyrimidine compounds of the general formula

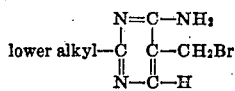

30. Pyrimidine compounds of the general formula

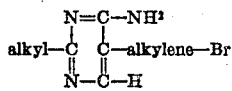

31. The process which comprises reacting a compound having the formula

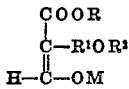

wherein R and $R^2$ are members of the class consisting of alkyl and aralkyl groups, $R^1$ is an alkylene group and M is an alkali metal, with a compound having the formula

wherein $R^3$ is a member of the class consisting of alkyl and aralkyl groups to produce a compound having the formula

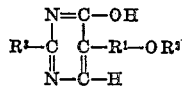

in which $R^1$, $R^2$ and $R^3$ have the same significance as above; replacing the hydroxy group in the latter compound with a halogen by treating said compound with a phosphorous-containing halogenating agent; replacing the halogen of the last mentioned compound with an amino group by treating said compound with ammonia; and treating the latter product with an acid to convert it into a pyrialkyl ester.

32. The process which comprises treating a 2-alkyl-6-amino-pyrialkyl-alkyl-ether with an acid to produce the corresponding pyrialkyl ester of the acid.

33. The process which comprises treating a 2-alkyl-6-amino-pyrimethyl-alkyl-ether with an acid to produce the corresponding pyrimethyl ester of the acid.

34. The process which comprises treating a 2-alkyl-6-amino-pyrimethyl-alkyl-ether with a hydrohalic acid to produce the corresponding pyrimethyl ester of the acid.

35. A series of pyrimidine compounds of the group having the general formulae

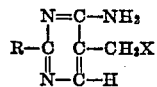

and

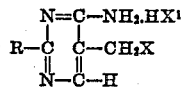

in which R is a lower alkyl group, X is an acid radical and $HX^1$ is an acid.

ROBERT R. WILLIAMS.
JOSEPH K. CLINE.